US012806669B2

(12) United States Patent
Luke

(10) Patent No.: US 12,806,669 B2
(45) Date of Patent: Nov. 24, 2026

(54) TANK CLEANING SYSTEM WITH MOUNTED SELF-OSCILLATING NOZZLE ASSEMBLY

(71) Applicant: The Modern Group, Ltd., Beaumont, TX (US)

(72) Inventor: Robert Paul Luke, Youngsville, LA (US)

(73) Assignee: The Modern Group, Ltd., Beaumont, TX (US)

(*) Notice: Subject to any disclaimer, the term of this patent is extended or adjusted under 35 U.S.C. 154(b) by 70 days.

(21) Appl. No.: 19/009,164

(22) Filed: Jan. 3, 2025

(65) Prior Publication Data

US 2025/0229305 A1 Jul. 17, 2025

Related U.S. Application Data

(60) Provisional application No. 63/619,945, filed on Jan. 11, 2024.

(51) Int. Cl.
*B08B 9/093* (2006.01)
*E21B 21/01* (2006.01)

(52) U.S. Cl.
CPC ............ *B08B 9/0936* (2013.01); *E21B 21/01* (2013.01)

(58) Field of Classification Search
CPC .............................. B08B 9/0936; E21B 21/01
USPC ...................................................... 134/166 R
See application file for complete search history.

(56) References Cited

U.S. PATENT DOCUMENTS

2017/0173617 A1* 6/2017 Zilai .................. B05B 13/0636

FOREIGN PATENT DOCUMENTS

JP 3175984 U * 6/2012 .............. B08B 9/08

OTHER PUBLICATIONS

JP3175984U—machine translation (Year: 2012).*

* cited by examiner

*Primary Examiner* — Tinsae B Ayalew
(74) *Attorney, Agent, or Firm* — Ewing & Jones PLLC

(57) ABSTRACT

Systems and methods deliver fluid using a nozzle assembly that rotates through a selectable oscillation pattern for cleaning tanks. The nozzle assembly rotates through the oscillation pattern automatically without requiring external manipulation of fluid flow through control lines. Installers use a quick mount and clamp assembly to secure the nozzle assembly inside of the tank. A smart manifold provides remote control of several of the nozzle assembly once installed in the tank.

18 Claims, 8 Drawing Sheets

TANK CLEANING SYSTEM WITH MOUNTED SELF-OSCILLATING NOZZLE ASSEMBLY

CROSS-REFERENCE TO RELATED APPLICATIONS

This application is a nonprovisional application which claims priority from U.S. provisional application No. 63/619,945, filed Jan. 11, 2024, which is incorporated by reference herein in its entirety.

TECHNICAL FIELD/FIELD OF THE DISCLOSURE

The present disclosure relates generally to fluid delivery systems using a spray head assembly that rotates through a selectable oscillation pattern.

BACKGROUND OF THE DISCLOSURE

Fluid holding tanks, such as mud tanks on boats or drilling rigs, often require cleaning out of solids settled in a bottom of the tank or between uses to washout a previous fluid before introducing a new fluid into the tank. The cleaning may use water or other cleaning fluid supplied through nozzles directed at walls and floors of the tank to wash inside of the tank as desired. The enclosed nature and poor air quality in the tanks makes manual cleaning by people in the tank a safety concern. Prior automated cleaning devices still may require significant setup time and effort inside of the tank by people. The complexity of the prior devices and associated long and complicated setup required increases both risk and potential for problems.

SUMMARY

The present disclosure provides for systems and methods to spray fluid, such as during cleaning of a tank.

For one embodiment, an apparatus for cleaning a tank includes a fluid for washing the tank, a manifold with a first actuatable valve and a second actuatable valve in communication with the fluid, and a first nozzle assembly coupled by a first hose to the first actuatable valve and a second nozzle assembly coupled by a second hose to the second actuatable valve. The nozzle assemblies each have a nozzle head that sprays the fluid from the hoses into the tank and rotates through an oscillation pattern using some of the fluid from the hoses diverted from the nozzle head. A computer in communication with the manifold sends control signals for operating the valves.

In one embodiment, a method of cleaning a tank includes providing a fluid for washing the tank, supplying the fluid to a manifold with a first actuatable valve and a second actuatable valve, and coupling a first hose between a first nozzle assembly and the first actuatable valve and a second hose between a second nozzle assembly and the second actuatable valve. The nozzle assemblies each have a nozzle head that sprays the fluid into the tank and rotates through an oscillation pattern using some of the fluid diverted from the nozzle head. The method further includes sending control signals to operate the valves with a computer in communication with the manifold.

According to one embodiment, an apparatus for cleaning a tank includes a nozzle head mounted in the tank and in communication with fluid from a hose to spray the fluid out of a nozzle into the tank. The nozzle head rotates through an oscillation pattern using a portion of the fluid diverted before flowing out of the nozzle. The apparatus also includes toggle assembly with a slider moveable between first and second positions for switching flow of the portion of the fluid between two ports of a drive assembly, an impeller in the drive assembly operatively connected to rotate the nozzle head clockwise and counterclockwise based on which of the two ports receive the portion of the fluid from the toggle assembly, and toggle switch actuators coupled to the nozzle head to rotate with the nozzle head and contact the slider of the toggle assembly resulting in rotational direction of the nozzle head being switched.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
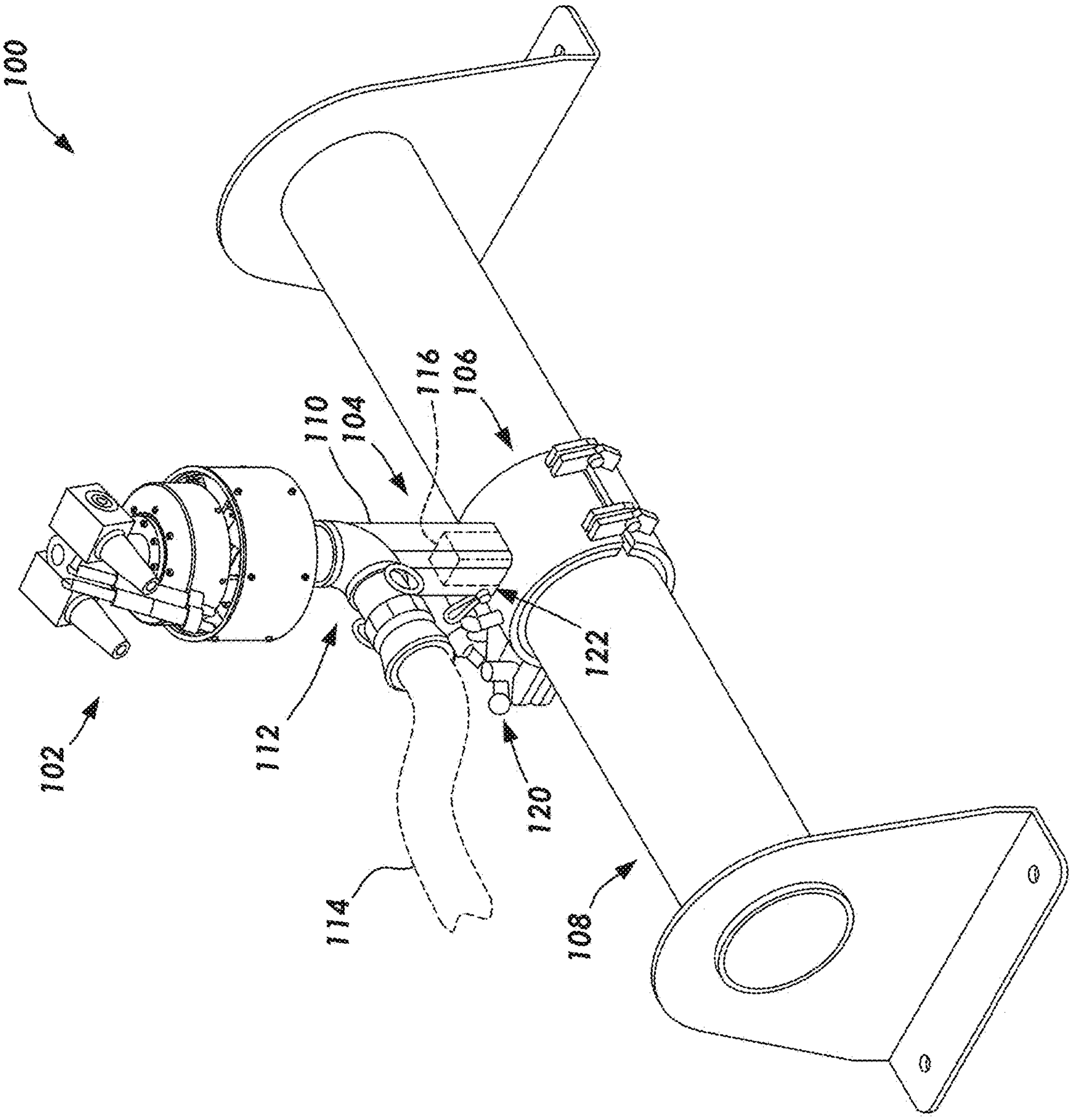
FIG. 1 is a view of a supply hose coupled to a head unit having a nozzle assembly and quick mount secured to a clamp assembly, according to one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an embodiment of head unit 100 that includes a nozzle assembly 102 coupled in fluid communication with a flow path through a quick mount 104 secured to a clamp assembly 106. The clamp assembly 106 secures around a support member 108, such as a pipe or rail. The quick mount 104 includes a receiver tube 110 extending from fittings 112, which provide the flow path into the nozzle assembly 102 and couple to a supply hose 114. Like a receiver hitch for towing, a stub mount 116 extending from the clamp assembly 106 inserts by sliding into the receiver tube 110 of the quick mount 104.

For some embodiments, the clamp assembly 106 opens with two clam halves of the clamp assembly 106 hinged together at a side of the clamp assembly 106 opposite a hand crank clasp 120 for placing the clamp assembly 106 on the support member 108. The hand crank clasp 120 may include two bolts hinged on one of the clam halves and rotatable into respective slots on the opposing clam half. Once positioned in the slots, nuts on the bolts have handles to facilitate easy tightening of the hand crank clasp 120 to bring the clam halves together into secure engagement around the support member 108. A friction coating, rubber layer or profile on an inner surface of the clamp assembly 106 in contact with the support member 108 may help prevent slipping of the clamp assembly 106 relative to the support member 108.

To facilitate easy installation and removal of the quick mount 104 onto the clamp assembly 106, a pin and clip 122 similar to those employed with receiver hitches for towing may be used within aligned holes through both the stub mount 116 and the receiver tube 110 to lock the stub mount 116 and the receiver tube 110 relative to each other. The outer shape of the stub mount 116 and mating inner shape of the receiver tube 110 may be non-circular, such as square, to also prevent torque produced by the nozzle assembly 102 in operation resulting in rotation of the quick mount 104. The fittings 112 may be welded to the receiver tube 110 and include elbows, adapters and/or couplings as necessary for connection of the supply hose 114 and the nozzle assembly 102 and orientation of the nozzle assembly 102 with the quick mount 104.

During installation, an installer may secure the head unit 100 where desired on the support member 108 without needing the help of others and without requiring any tools. First, the installer fixes the clamp assembly 106 onto the support member 108. The installer then places the nozzle assembly 102 and quick mount 104 while connected together onto the stub mount 116 and uses the pin and clip 122 to finish assembling together the head unit 100. In some embodiments, coupling of the supply hose 114 to the head unit 100 completes the installation.

Figure 9:
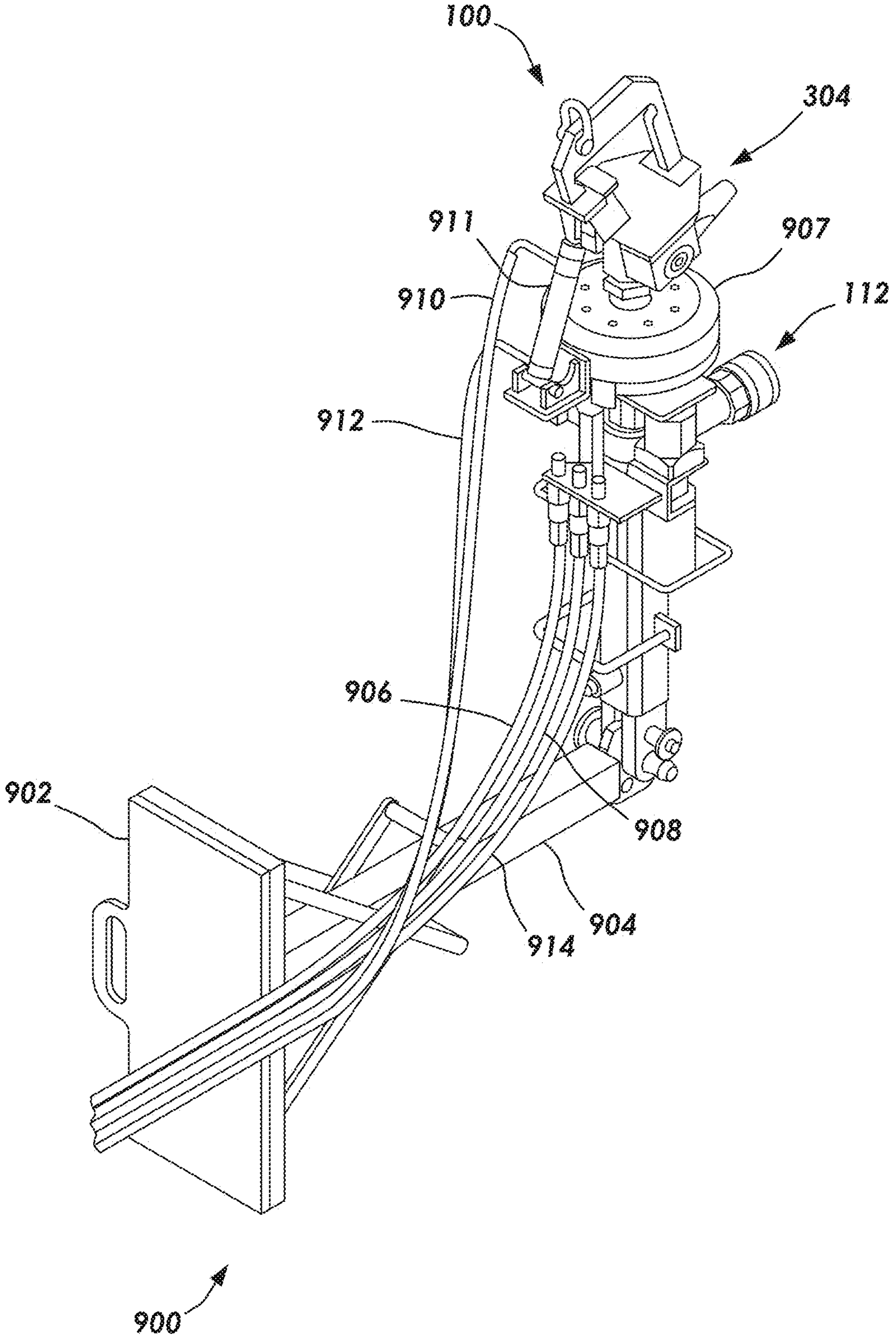
FIG. 9 is a view of control lines coupled to a head unit having a nozzle assembly and a magnetic securing mechanism, according to an embodiment of the present disclosure.

In another embodiment, such as that shown in FIG. 9, head unit 100 may be secured to a tank through the use of a magnetic securing mechanism 900. The magnetic securing mechanism 900 may include magnet 902 attached to extension arm 904. The magnet 902 secures the extension arm 904 via magnetic forces to a wall, floor or ceiling surface directly inside a tank to be cleaned or ferromagnetic mounting plates disposed in the tank. Extension arm 904 may be affixed to head unit 100. The magnetic securing mechanism 900 may be employed with any of the head units 100 and associated systems described herein.

As described further with respect to FIGS. 3-8, the nozzle assembly 102 rotates on its own to produce an oscillating spray path using part of fluid being supplied through the supply hose 114 for spraying out without requiring additional hydraulic, pneumatic or electrical control lines to be run and attached to the nozzle assembly 102 for the rotation. Some embodiments use additional control lines but only for inclination control separate from self-oscillation of the nozzle assembly 102. When the spray is emitted from the nozzle assembly 102 perpendicular to an axis of the rotation, a plane of spray resulting from the self-oscillation of the nozzle assembly 102 may be setup to be horizontal (or otherwise tilted from horizontal if desired) based on orientation of the stub mount 116 as determined by how the clamp assembly 106 is fixed by the installer along with directionality of the nozzle assembly 102 created by the fittings 112.

Figure 2:
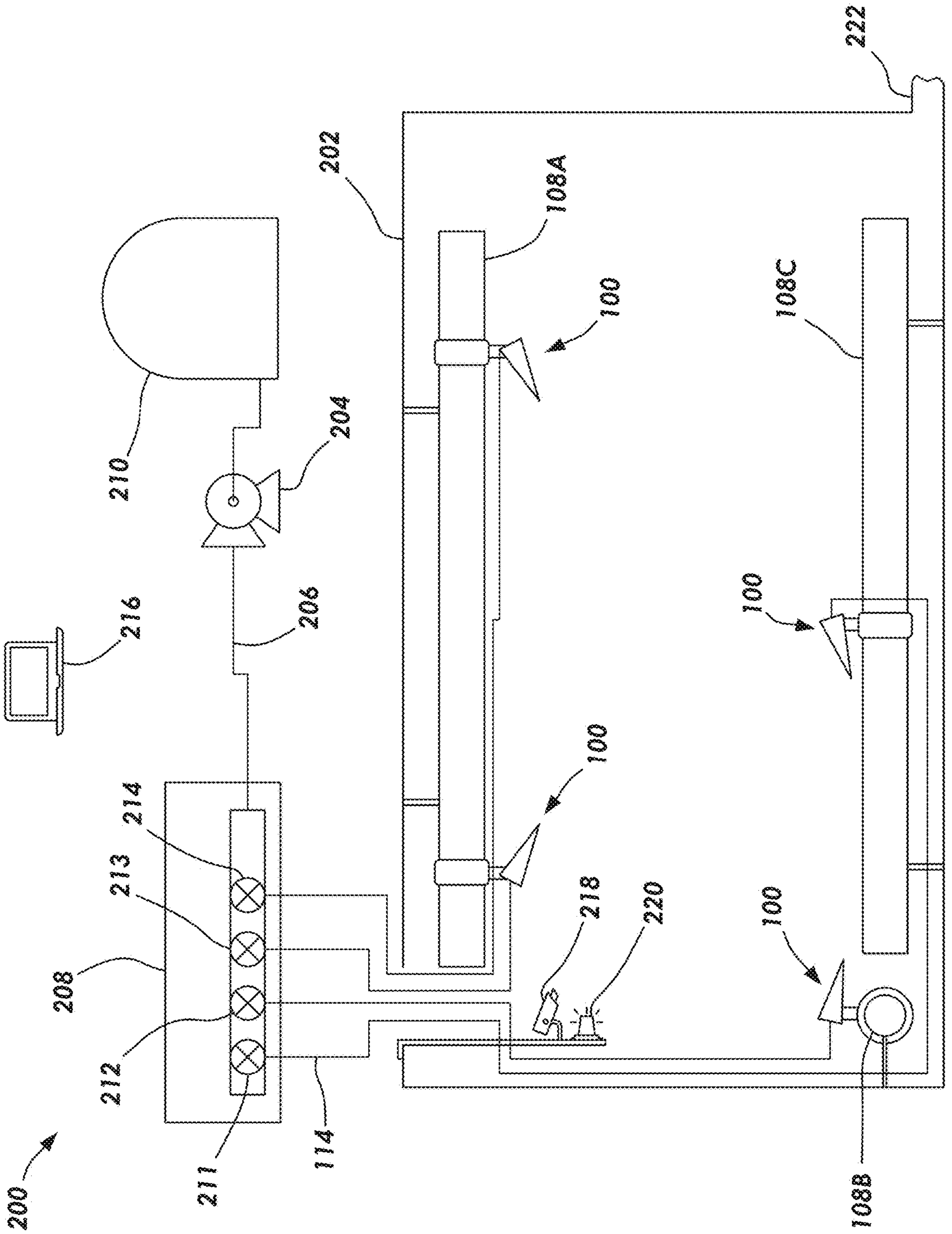
FIG. 2 is a schematic view of tank cleaning system with four of the head units disposed in a tank, in accordance with embodiments of the present disclosure.

FIG. 2 shows tank cleaning system 200 with four of the head units 100 disposed in a tank 202. Any number and placement of the head units 100 may be installed and used depending on factors including dimensions of the tank 202, type of cleaning procedure needed and features of the tank 202. As an example, the tank 202 includes a top support member 108A having two of the head units 100 installed and one of the head units 100 installed on each of a back support member 108B and a side support member 108C. The support members 108A, 108B, 108C are fixed in the tank 202 and are sometimes referred to as gun rails running along and proximate walls of the tank 202. The tank 202 may be a fluid holding vessel, such as a mud vessel used in drilling of oil/gas wells, on a boat or offshore rig and may have a rectangular shape, such as at least 15 feet by at least 20 feet, with a wall height of 12 to 15 feet or more.

Tank cleaning system 200 further includes a pump 204 connected by conduit 206 to a manifold skid 208 and fluid supply 210. Examples of the fluid supply 210 include water or water mixtures with caustic chemicals or detergents. First, second, third and fourth actuatable valves 211, 212, 213, 214 of a manifold disposed on the manifold skid 208 enable an operator to control which of the head units 100 are functioning. The supply hose 114 couples one or more of the head units 100 to one of the actuatable valves 211, 212, 213, 214. As shown, the manifold skid 208 setup delivers fluid with the first actuatable valve 211 selectively to the head unit 100 on the back support member 108B, with the second actuatable valve 212 selectively to the head unit 100 on the side support member 108C and with the third and fourth actuatable valves 213, 214 selectively to the head unit 100 on the back support member 108B.

The actuatable valves 211, 212, 213, 214 may be electrically or pneumatically operated and connected, wired or wirelessly, to a computer 216 for control of a cleaning process by the operator external of the tank 202. The computer 216 may also receive, through wired or wireless connection, images from a camera 218 placed in the tank 202 along with lighting 220 to monitor remotely the cleaning process and remotely make any desired adjustments to the actuatable valves 211, 212, 213, 214. The computer 216 may further be used by the operator based on observed cleaning progress to control actuators for individually adjusting spray inclination of the nozzle assembly 102 associated with each of the head units 100. By example, the operator may clean walls first with the head units 100 on the top support member 108A before using the head unit 100 on the side support member 108C for floor cleaning into a trench of the tank 202 and finally proceeding to use the head unit 100 on the back support member 108B to finish the cleaning process by pushing debris out to a drain 222, which may be a weir system of the tank 202. The drain 222 may provide fluid communication back to the fluid supply 210 for recycling in some embodiments.

Figure 3:
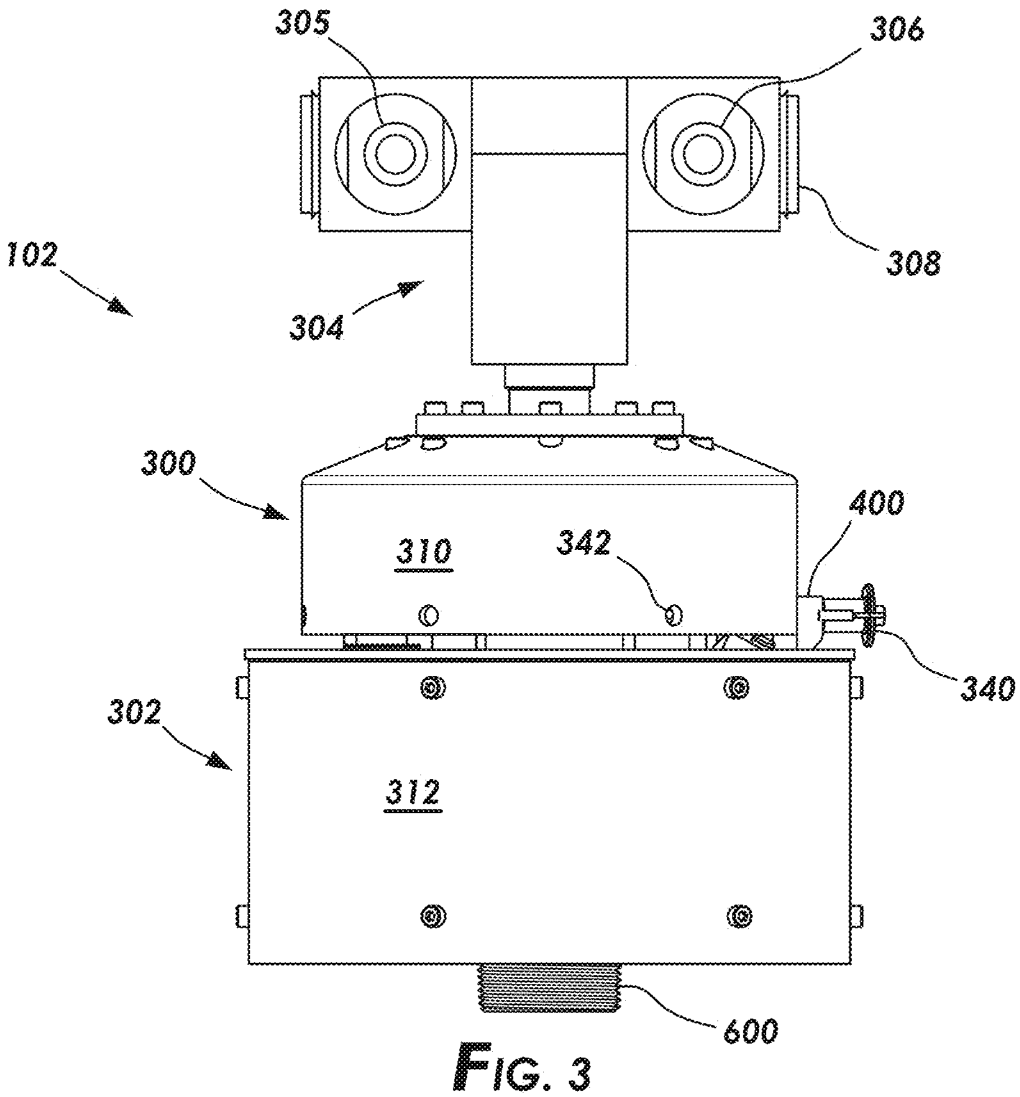
FIG. 3 is a front view of the nozzle assembly, according to an embodiment of the present disclosure.

FIG. 3 illustrates the nozzle assembly 102 of the head unit 100 shown in FIGS. 1 and 2 with a threaded end of a central flow tube 600 extending from a bottom of the nozzle assembly 102 and used to couple with the fittings 112 on the quick mount 104 of the head unit 100. The nozzle assembly

102 includes a rotating top part 300, a stationary bottom part 302 and a nozzle head 304 extending out of the rotating top part 300 at a top of the nozzle assembly 102. The nozzle head 304 may include any arrangement and type of nozzles for directing spray in a useful pattern for the cleaning process. A first nozzle 305 offset from center of the nozzle assembly 102 equidistant from a second nozzle 306 evens out torque distribution caused by the spray from the first and second nozzles 305, 306.

In a position of the first and second nozzles 305, 306 depicted in FIG. 3, the first and second nozzles 305, 306 spray out of the nozzle assembly 102 in a direction perpendicular to the axis of the rotation of the rotating top part 300, which rotates around a longitudinal axis of the central flow tube 600. In some embodiments, an inclination actuator 308 connected with the first and second nozzles 305, 306 rotates the first and second nozzles 305, 306 around a perpendicular axis to the axis of the rotation of the rotating top part 300. The inclination actuator 308 can thereby adjust spray inclination of the nozzle assembly 102 making the nozzles 305, 306 angled and not perpendicular with the longitudinal axis of the central flow tube 600. If the rotation of the rotating top part 300 is positioned for rotating the nozzles 305, 306 through a horizontal spray pattern, the inclination actuator 308 then provides movement of the nozzles 305, 306 through a vertical spray pattern.

For some embodiments, the inclination actuator 308 includes a pneumatic cylinder connected to the nozzle head 304 to provide the movement of the nozzles 305, 306. The pneumatic cylinder may be coupled with a pneumatic control line for remote operation of the inclination actuator 308. The inclination actuator 308 in other embodiments uses an electric motor for the movement of the nozzles 305, 306 and may include wired power or a battery along with wired or wireless connections for control signals supplied remotely to the inclination actuator 308.

A top housing 310 of the rotating top part 300 and a bottom housing 312 of the stationary bottom part 302 surround internal working components of the nozzle assembly 102. The top housing 310 also functions as an attachment for a toggle switch actuator 400. The toggle switch actuator 400 attaches to an outer surface of the top housing 310 at a bottom perimeter edge and extends downward from the bottom perimeter edge. The downward extension places a portion of the toggle switch actuator 400 during rotation of the rotating top part 300 in an interference path with a slider 704 of a toggle assembly 700 further shown and described with respect to FIGS. 5 and 7.

A key 340 secures the toggle switch actuator 400 to the top housing 310 at any one of openings 342 spaced around a circumference of the top housing 310. The key 340 in some embodiments is a cylindrical dowel with a button handle on one end and an opposite end having a quick release spring loaded ball for retaining the key 340 in position once inserted into a desired one of the openings 342. Based on operation of the toggle assembly 700 described herein, placement of two of the toggle switch actuators 400 around the top housing 310 defines angular extent (e.g., full circle/360°, half circle/180° or quarter) circle/90° of oscillation for the nozzle assembly 102. The operator may adjust the angular extent of oscillation for the nozzle assembly 102 without requiring tools by changing which of the openings 342 have the two toggle switch actuators 400.

Figure 4:
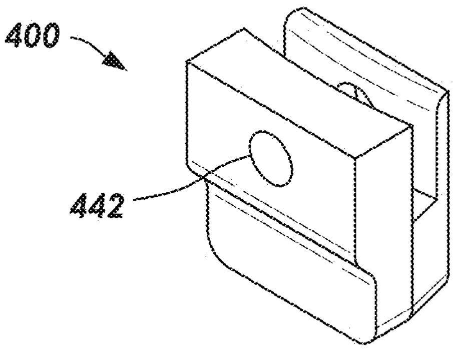
FIG. 4 is an isometric view of a toggle switch actuator, for an embodiment of the present disclosure.

FIG. 4 shows the toggle switch actuator 400. The toggle switch actuator 400 defines a U-shape for sandwiching the bottom perimeter edge of the top housing 310. An aperture 442 extending through the toggle switch actuator 400 receives the key 340 securing the toggle switch actuator 400 to the top housing 310.

Figure 5:
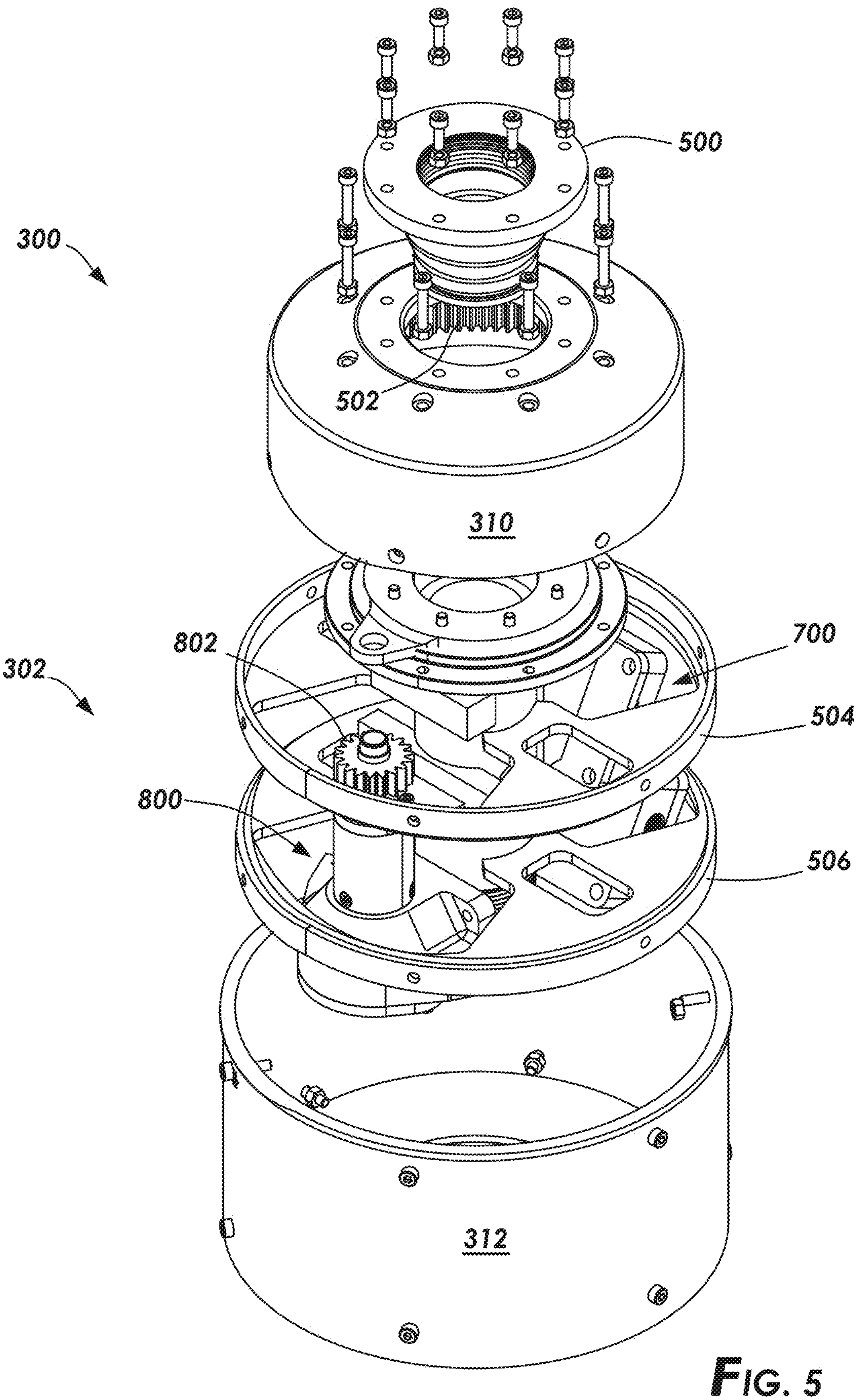
FIG. 5 is an exploded isometric view of a rotating top part and a stationary bottom part of the nozzle assembly, in an embodiment of the present disclosure.

FIG. 5 depicts the rotating top part 300 and the stationary bottom part 302 of the nozzle assembly 102. An internal threaded bore of a swivel top 500 of the rotating top part 300 mates with the nozzle head 304. The swivel top 500 couples to the central flow tube 600 via a swivel connection for relative rotation while maintaining the flow path through the nozzle assembly 102.

An internal annular gear 502 having inward facing teeth attaches in a fixed manner to the swivel top 500. The internal annular gear 502 mates with pinion 802 of a drive assembly 800. The drive assembly 800 passes through an upper plate 504 and a lower plate 506 onto which the bottom housing 312 is secured. In operation, the pinion 802 of the drive assembly 800 rotates the rotating top part 300 due to the internal annular gear 502 and hence also rotates the nozzle head 304.

Figure 6:
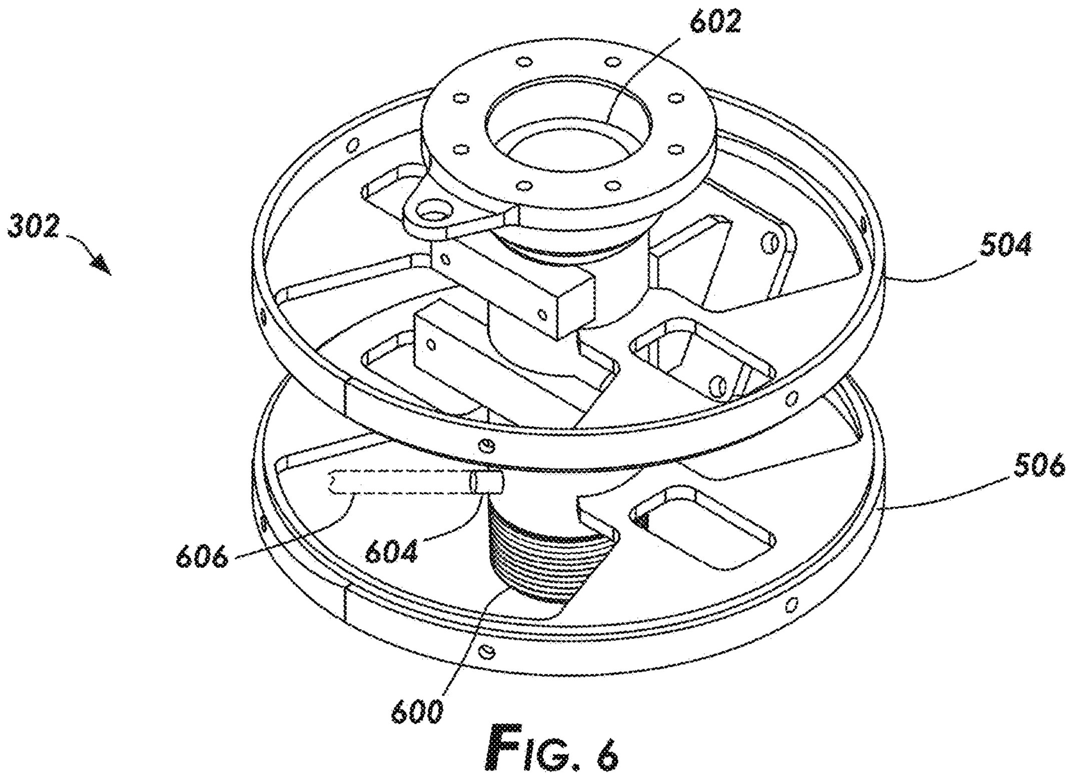
FIG. 6 is an isometric view of a center support within the stationary bottom part of the nozzle assembly, according to an embodiment of the present disclosure.

FIG. 6 illustrates the central flow tube 600 with the upper and lower plates 504, 506 attached to form a center support within the stationary bottom part 302 of the nozzle assembly 102. The center flow tube 600 provides mounting positions for the toggle assembly 700 and drive assembly 800 as shown in FIG. 5. A receptacle bore 602 at the top end of the central flow tube 600 opposite the threaded end of the central flow tube 600 receives the swivel top 500 shown in FIG. 5.

The central flow tube 600 defines the flow path of the fluid though the nozzle assembly 102 to the nozzles head 304. An auxiliary outlet 604 tapped into a side of the central flow tube 600 establishes a fluid communication with inside the central flow tube 600. A toggle inlet line 606 connects between the auxiliary outlet 604 and an input port of the toggle assembly 700 shown in FIG. 7

Figure 7:
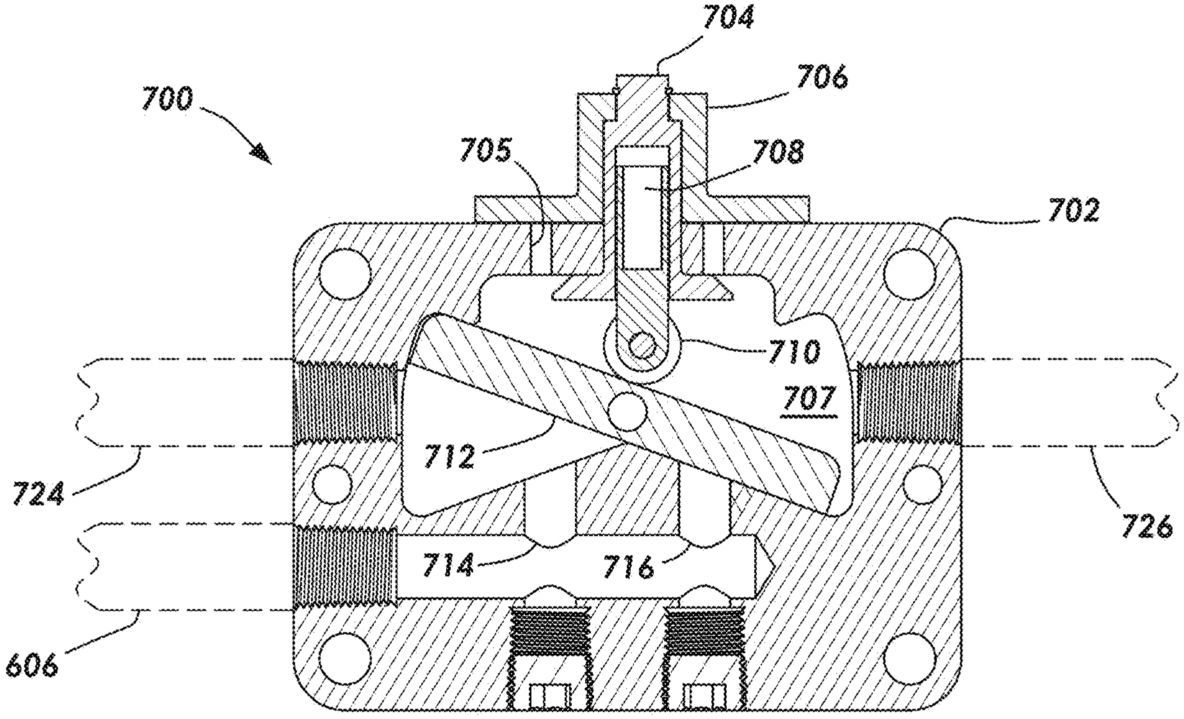
FIG. 7 is a cross-section view of a toggle assembly in the stationary bottom part of the nozzle assembly, in accordance with an embodiment of the present disclosure.

FIG. 7 shows the toggle assembly 700 in the stationary bottom part 302 of the nozzle assembly 102. The toggle assembly 700 includes a toggle housing 702 with the slider 704 disposed in a slot 705 through a top of the toggle housing 702. A switch cover 706 captures a portion of the slider 704 extending outside the toggle housing 702 through the slot 705 retaining the slider 704 within the slot 705 and into a chamber 707 formed inside of the toggle housing 702. A biased roller support 708 extends from the slider 704 and urges a roller 710 at an end of the biased roller support 708 towards a rocker 712.

The rocker 712 selectively blocks flow from the toggle inlet line 606 through either a left chamber port 714 or a right chamber port 716 from entering the chamber 707. If the slider 704 is pushed right of a pivot point of the rocker 712 as portrayed in FIG. 7, the roller 710 acts to force the rocker 712 down onto the right chamber port 716 blocking flow through the right chamber port with the left chamber port 714 open to flow into the chamber 707 and through outlet port to an impeller forward line 724. Pushing the slider 704 left of the pivot point of the rocker 712 causes the roller 710 to force the rocker 712 down onto the left chamber port 714 blocking flow through the left chamber port 714 with the right chamber port 716 open to flow into the chamber 707 and through another outlet port to an impeller reverse line 726. Compared to other hydraulic switches, balanced force required for moving the slider 704 right to left and left to right makes efficient transitions during oscillations of the nozzle assembly 102 without becoming stuck and not changing directions.

In operation, pushing of the slider 704 results from rotation of the rotating top part 300 moving the toggle switch actuators 400 into pushing contact with the slider 704. The slider 704 functions, as further explained with respect to the drive assembly 800 shown in FIG. 8, to change rotational direction of the rotating top part 300 with every contact by any of the toggle switch actuators 400 placed around the top housing 310. The toggle switch actuator 400 contact by clockwise rotation thus pushes the slider 704 in one direction whereas the toggle switch actuator 400 contact from counter-clockwise rotation pushes the slider 704 in the opposite direction.

Figure 8:
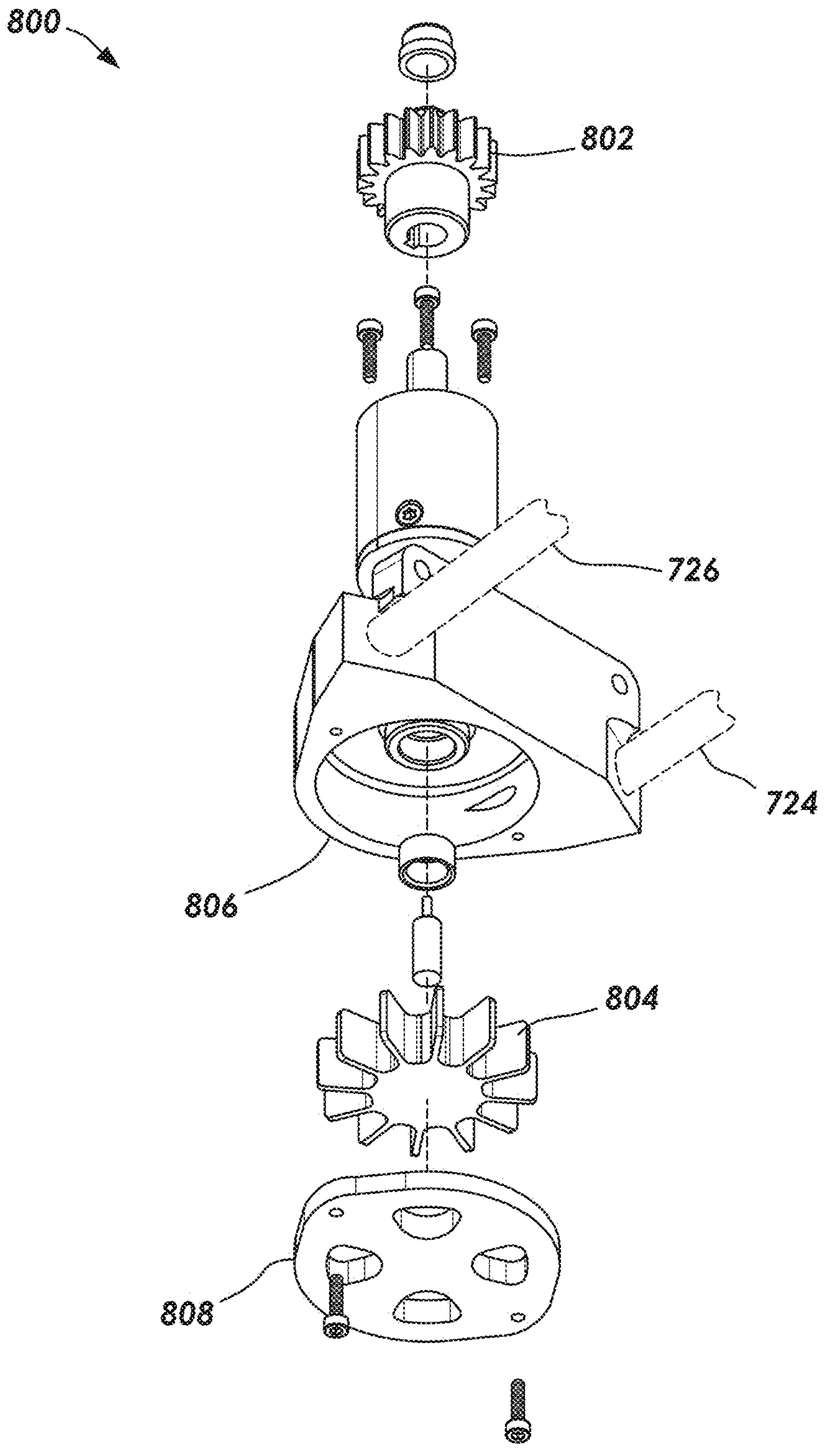
FIG. 8 is an exploded isometric view of a drive assembly in the stationary bottom part of the nozzle assembly, for an embodiment of the present disclosure.

FIG. 8 illustrates the drive assembly 800 in the stationary bottom part 302 of the nozzle assembly 102. The drive assembly 800 includes the pinion 802 operatively coupled to an impeller 804 disposed in an impeller housing 806. Input ports of the impeller housing 806 connect the drive assembly 800 with the toggle assembly 700 using the impeller forward line 724 and impeller reverse line 726 to supply fluid at opposite sides of the impeller 804.

During operation, the impeller 804 spins in one direction when the toggle assembly 700 supplies fluid through the impeller forward line 724 instead of the impeller reverse line 726 and spins in the opposite direction when the toggle assembly 700 is flipped supplying fluid through the impeller reverse line 726 instead of the impeller forward line 724. The impeller 804 turns the pinion 802 and hence the internal annular gear 502 shown in FIG. 5 and nozzle head 304 shown in FIG. 3. An impeller housing cap 808 encloses the impeller 804 in the impeller housing 806 and is perforated to exhaust the fluid supplied to the impeller 804. Exhausted fluid from the impeller housing 806 mixes back with sprayed fluids during the cleaning process without any leaked fluids being an issue.

Figure 10:
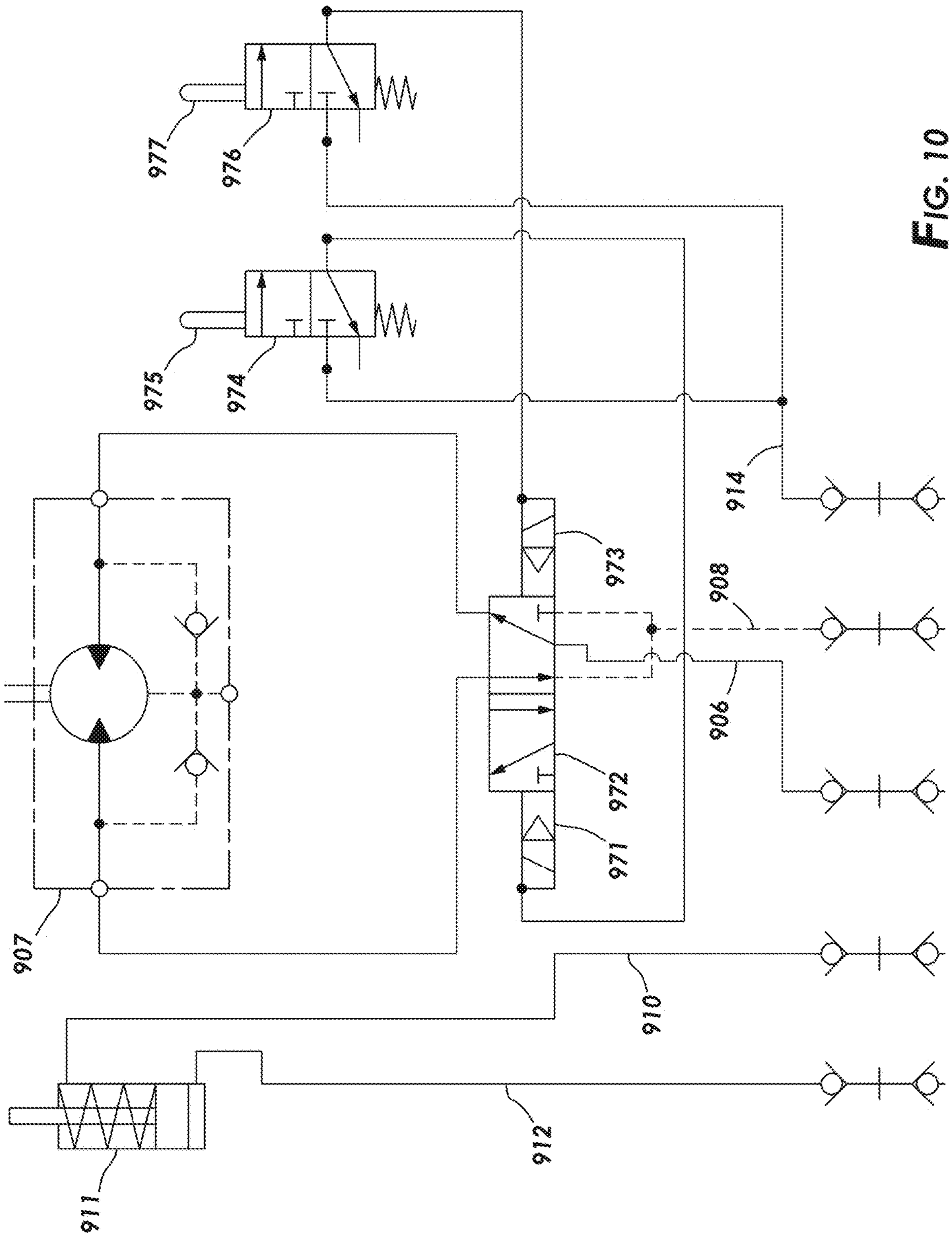
FIG. 10 is a schematic view with the control lines for the head unit of FIG. 9, according to an embodiment of the present disclosure.

In another embodiment, as shown in FIG. 9 and FIG. 10, hydraulic actuation moves the nozzle head 304 through both rotational and inclination independent of fluid supplied through the fittings 112 for spraying out of the nozzle head 304. For example, an oscillation control line 906 may couple to a switch valve assembly 972 that selectively supplies fluid, which may be liquid, to a clockwise drive side of a rotary vane actuator 907 and a counterclockwise drive side of the rotary vane actuator 907. A return control line 908 also couples to the switch valve assembly 972 to receive the fluid supplied by the oscillation control line 906 and subsequently output from rotary vane actuator 907 accordingly.

The rotary vane actuator 907 supports the nozzle head 304 on the extension arm 904 and includes the switch valve assembly 972 along with a clockwise limiter valve 974 and a counterclockwise limiter valve 976. The clockwise and counterclockwise limiter valves 974, 976 operatively couple as part of the rotary vane actuator 907 such that the switch valve assembly 972 and the clockwise and counterclockwise limiter valves 974, 976 function to move the nozzle head 304 rotationally through an oscillation pattern automatically without further remote control to change rotational direction. A switching control line 914 supplies fluid, which may be a gas, to the clockwise and counterclockwise limiter valves 974, 976, which are respectively coupled to selectively supply the gas to either a first input 971 of the switch valve assembly 972 or a second input 973 of the switch valve assembly 972. Supplying the gas to the first input 971 or the second input 973 of the switch valve assembly 972 causes the switch valve assembly 972 to toggle supplying the fluid from the oscillation control line 906 between the clockwise and the counterclockwise drive sides of the rotary vane actuator 907.

In operation, a first poppet 975 of the clockwise limiter valve 974 that is normally biased outward is temporarily depressed when contacted by a valve actuator due to clockwise movement of the rotary vane actuator 907. For example, the clockwise limiter valve 974 may be stationarily disposed relatively in the head unit 100 while the valve actuator (in a similar manner as the toggle switch actuator 400 shown in FIG. 3) rotates with the nozzle head 304 and comes into interfering contact with the first poppet 975. The depressing of the first poppet 975 on the clockwise limiter valve 974 temporarily sends the gas from the switching control line 914 to the first input 971 of the switch valve assembly 972 changing flow through the switch valve assembly 972 and hence rotational moving direction of the rotary vane actuator 907. Counterclockwise movement of the rotary vane actuator 907 then causes a second poppet 977 of the counterclockwise limiter valve 976 that is normally biased outward to be temporarily depressed when contacted by the same or different valve actuator. The depressing of the second poppet 977 on the counterclockwise limiter valve 976 temporarily sends the gas from the switching control line 914 to the second input 973 of the switch valve assembly 972 changing flow through the switch valve assembly 972 and hence rotational moving direction of the rotary vane actuator 907. The first and second poppets 975, 977 return to normal outward positions once the valve actuator(s) moving in the opposite direction lacks contact making gas being only temporarily supplied to toggle the switch valve assembly 972.

An up control line 910 may couple to a first side of a piston and cylinder actuator 911 while a down control line 912 may oppositely couple to a second side of the piston and cylinder actuator 911. The piston and cylinder actuator 911 supports a back side of the nozzle head 304 pivotably mounted on the rotary vane actuator 907 such that selectively supplying hydraulic fluid to the up and down control lines 910, 912 provides inclinational movement of the nozzle head 304. All the control lines 906, 908, 910, 912, 914 extend to outside of the tank where module ends of the control lines 906, 908, 910, 912, 914 couple to respective ports on a control module that supplies the hydraulic fluid or gas. While the oscillation, return and switching control lines 906, 908, 914 all being turned on without further manipulation results in self-oscillation of the nozzle head 304, an operator or computer may adjust flow through the up and down control lines 910, 912 to adjust inclination. The control module may be operated by and connected to the computer 216 as discussed with respect to FIG. 2.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An apparatus for cleaning a tank, comprising:

a fluid for washing the tank;

a manifold with a first actuatable valve and a second actuatable valve in communication with the fluid;

a first nozzle assembly coupled by a first hose to the first actuatable valve and a second nozzle assembly coupled by a second hose to the second actuatable valve, wherein the nozzle assemblies each have a nozzle head that sprays the fluid from the hoses into the tank and rotates through an oscillation pattern, wherein each of the nozzle assemblies rotates through the oscillation pattern using a hydraulic control line and a switching control line that supplies gas to operate a switch valve assembly selectively directing flow from the hydraulic control line; and a computer in communication with the manifold to send control signals for operating the valves.

2. The apparatus of claim 1, further comprising first and second quick mounts coupled respectively to the first and second nozzle assemblies, wherein each of the quick mounts has a receiver tube for mating with a stub mount on a clamp assembly attached to a support member fixed in the tank.

3. The apparatus of claim 1, further comprising first and second magnetic securing mechanisms to respectively secure the first and second nozzle assemblies in the tank.

4. The apparatus of claim 1, further comprising first and second clamp assemblies to respectively secure the first and second nozzle assemblies to a support member fixed in the tank, wherein each of the clamp assemblies are openable to position around the support member and closable with a hand crank clasp for tightening the clamp assembly onto the support member.

5. The apparatus of claim 1, further comprising a camera disposed in the tank and in connection with the computer to send images of inside the tank displayed on the computer.

6. The apparatus of claim 1, wherein an angular extent of the oscillation pattern is selectable for each of the nozzle assemblies by positioning of limiter valves around a circumference of the nozzle assembly.

7. The apparatus of claim 1, wherein each of the nozzle assemblies further comprise an actuator to control inclination of the nozzle head perpendicular to the oscillation pattern.

8. An apparatus for cleaning a tank, comprising:

a nozzle head mounted in the tank and in communication with fluid from a hose to spray the fluid out of a nozzle into the tank, wherein the nozzle head rotates through an oscillation pattern using a portion of the fluid diverted before flowing out of the nozzle;

a toggle assembly with a slider moveable between first and second positions for switching flow of the portion of the fluid between two ports of a drive assembly;

an impeller in the drive assembly operatively connected to rotate the nozzle head clockwise and counterclockwise based on which of the two ports receive the portion of the fluid from the toggle assembly; and toggle switch actuators coupled to the nozzle head to rotate with the nozzle head and contact the slider of the toggle assembly resulting in rotational direction of the nozzle head being switched.

9. The apparatus of claim 8, further comprising a quick mount coupled to the nozzle head, wherein the quick mount has a receiver tube for slidable mating with a stub mount on a clamp assembly attached to a support member fixed in the tank.

10. The apparatus of claim 8, wherein an angular extent of the oscillation pattern is selectable for the nozzle head by positioning of the toggle switch actuators.

11. The apparatus of claim 8, wherein the nozzle head has an actuator to control inclination of the nozzle head perpendicular to the oscillation pattern.

12. An apparatus for cleaning a tank, comprising:

a fluid for washing the tank;

a manifold with a first actuatable valve and a second actuatable valve in communication with the fluid;

a first nozzle assembly coupled by a first hose to the first actuatable valve and a second nozzle assembly coupled by a second hose to the second actuatable valve, wherein the nozzle assemblies each have a nozzle head that sprays the fluid from the hoses into the tank and rotates through an oscillation pattern;

a computer in communication with the manifold to send control signals for operating the valves; and first and second magnetic securing mechanisms to respectively secure the first and second nozzle assemblies in the tank.

13. The apparatus of claim 12, wherein each of the nozzle assemblies rotates through the oscillation pattern using some of the fluid from the hoses diverted from the nozzle head.

14. The apparatus of claim 12, wherein each of the nozzle assemblies include:

a toggle assembly with a slider moveable between first and second positions for switching flow of the fluid between two ports of a drive assembly;

an impeller in the drive assembly operatively connected to rotate the nozzle head clockwise and counterclockwise based on which of the two ports receive the fluid from the toggle assembly; and toggle switch actuators coupled to the nozzle head to rotate with the nozzle head and contact the slider of the toggle assembly.

15. The apparatus of claim 12, further comprising a camera disposed in the tank and in connection with the computer to send images of inside the tank displayed on the computer.

16. The apparatus of claim 12, wherein an angular extent of the oscillation pattern is selectable for each of the nozzle assemblies by positioning of toggle switch actuators around a circumference of the nozzle assembly.

17. The apparatus of claim 12, wherein an angular extent of the oscillation pattern is selectable for each of the nozzle assemblies by positioning of limiter valves around a circumference of the nozzle assembly.

18. The apparatus of claim 12, wherein each of the nozzle assemblies further comprise an actuator to control inclination of the nozzle head perpendicular to the oscillation pattern.

* * * * *